March 19, 1935.   O. U. ZERK   1,994,558
METHOD FOR MAKING WHEELS
Filed Dec. 26, 1931   3 Sheets-Sheet 1
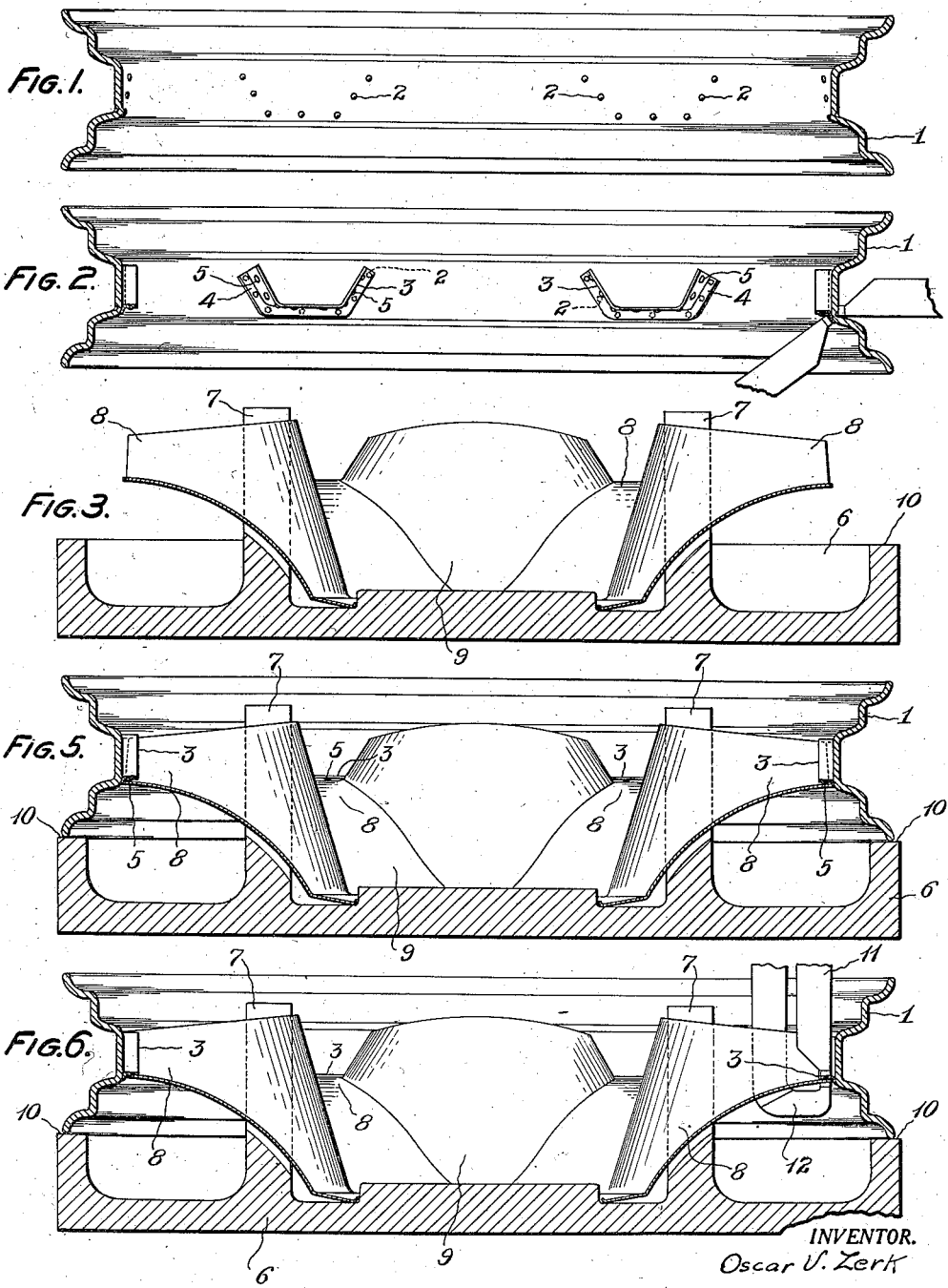
INVENTOR.
Oscar U. Zerk
BY
Slough and Canfield
ATTORNEYS March 19, 1935.  O. U. ZERK  1,994,558
METHOD FOR MAKING WHEELS
Filed Dec. 26, 1931  3 Sheets-Sheet 2
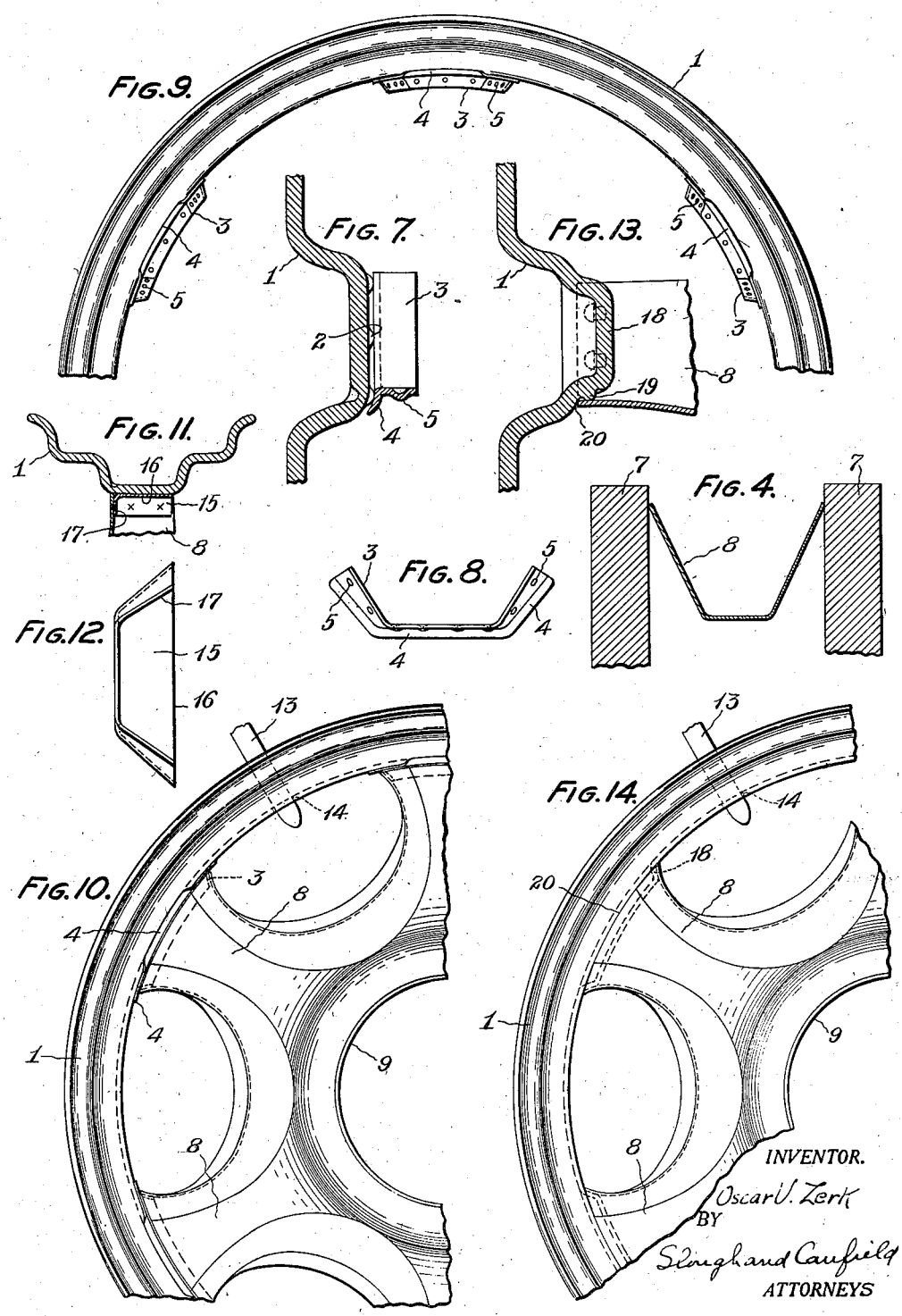

March 19, 1935.　　　　O. U. ZERK　　　　1,994,558
METHOD FOR MAKING WHEELS
Filed Dec. 26, 1931　　　3 Sheets-Sheet 3
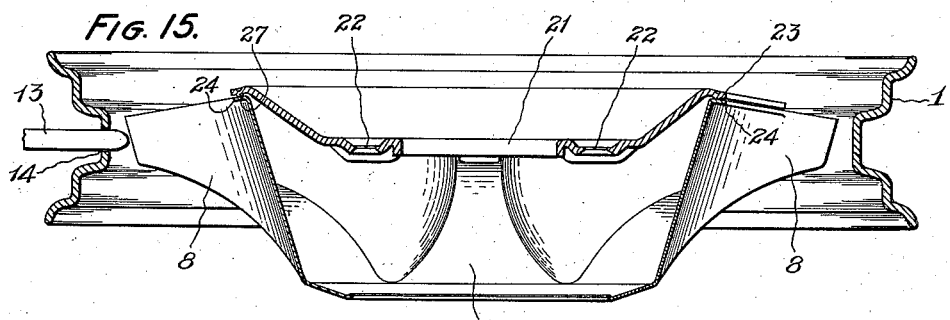
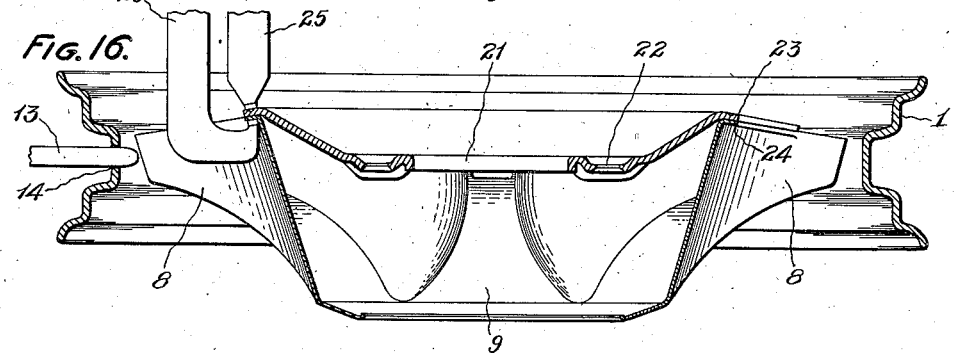
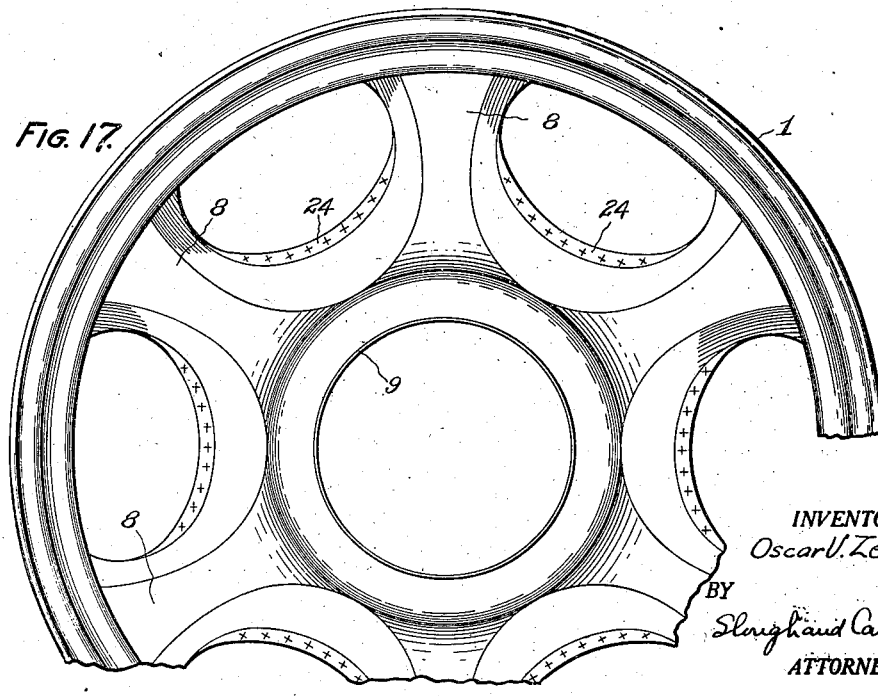
INVENTOR.
Oscar U. Zerk
BY
ATTORNEYS Patented Mar. 19, 1935

1,994,558

UNITED STATES PATENT OFFICE 1,994,558

METHOD FOR MAKING WHEELS

Oscar U. Zerk, Cleveland, Ohio, assignor to Zerk Corporation, a corporation of Delaware Application December 26, 1931, Serial No. 583,334

5 Claims. (Cl. 29—159)

This invention relates to methods of manufacturing wheels.

While this invention may be employed in the manufacture of wheels of various types, it is most particularly applicable to the manufacture of automobile wheels. According to present day practices, automobile wheels are made up of a large number of parts, for instance, wire wheels and wood wheels, which involve a large number of operations in the assembly of the wheel.

It is an object of my invention to provide a novel method of wheel construction involving a minimum number of operations and parts.

According to the method of my invention, the wheel is considered as composed of three essention parts, namely, the rim, a wheel attaching flange, and a spoke unit.

The rim of the wheel is of conventional construction, and the wheel attaching flange is a sheet metal single piece formed by pressing or spinning or any other suitable manner. According to my invention, the spoke portion of the wheel is made from a single piece of sheet metal by a pressing or the like operation.

In order that a wheel satisfactory in use may be made with the minimum expense, the method of uniting the parts of the wheel adapted to rapid production method and inherently of a character to produce a strong, durable wheel is essential. Accordingly, it is necessary to provide the parts of the wheel with such inherent characteristics as readily adapt those parts to accurate assembly despite variations in sizes of the parts within the tolerances permissible according to rapid production methods.

According to my invention, I accomplish this object by making at least one of the parts of the wheel resilient in nature so that when assembling the parts, the resilient parts may be sufficiently sprung to make a satisfactory fit between the parts and afford an opportunity for creating joints between the parts.

In order that the number of parts may be maintained at a minimum and the number of operations simplified, the method of welding is used for securing the parts of the wheel together.

According to the invention disclosed in my copending application Serial No. 583,333, filed December 26, 1931, the spoke unit may be welded directly to the rim. According to the invention of my copending application, the welded inner face between the spoke unit and the rim lie in a plane parallel with the axis of the wheel and, also, the welded inner faces between the wheel attaching flange and the spoke unit lie approximately parallel to the axis of the wheel.

In order to obtain a maximum of facility and efficiency in the welding operation, the parts of my wheel are so constructed and arranged, according to my present invention, that the welded inner face between the various parts will lie in a plane perpendicular to the axis of the wheel thereby permitting a maximum of accessibility to those parts for the welding operation.

Inasmuch as the inner surface of the conventional rim is coaxial with the axis of the wheel, and since it is desirable to so arrange the welding surfaces between the spoke unit and the rim as to form the welding inner face in a plane perpendicular to the axis of the wheel, it is necessary to form upon the rim a suitable surface having a face perpendicular to the axis of the rim.

Without intending to limit my invention more than is required by the prior art, I may attain this result by fastening an additional element to the rim at the point where the end of the spoke is to be attached, there being a plurality of such elements disposed about the inner surface of the rim. Alternatively, I may form a projection in the metal of the rim providing such a surface perpendicular to the axis of the rim to which the end of the spoke may be welded.

In order to obtain a satisfactory welding joint between the parts of the wheel, it is essential that the parts at the inner-face of the weld be brought to approximately the same temperature. The temperatures of the parts being welded are determined largely by their relative capacity to dissipate heat away from the point of the weld. In the case of automobile wheels, it is essential that the rim be a heavier element than the spoke portion. Therefore, it is a tendency of the rim to dissipate heat away more rapidly from the weld than the spoke portion; and accordingly, the spoke portion of the weld tends to attain too high a temperature while the rim portion of the weld maintains too low a temperature in order to form a satisfactory union. Also, in order that a satisfactory weld may be made over a large area, it is necessary to provide a plurality of points of contact between the parts to be welded. Accordingly, I form a plurality of projections on one of the parts at the inner-face of the weld. The presence of the projections on one of the parts tends to reduce the capacity of that part to dissipate heat away from the weld. Accordingly, I form the projections on the rim thereby reducing its capacity to dissipate heat from the weld so that the temperature attained by the two parts of the weld will be more nearly the same.

Where projections are formed in the metal of the rim to afford a surface lying in a plane perpendicular to the axis of the rim, the projections are formed in such surface in the metal of the rim, and the end of the spoke is fitted over the projection and welded thereto. Where the surface on the rim perpendicular to the axis of the rim is provided by an additional element, the element is of a weight intermediate that of the metal of the spoke unit and that of the metal of the rim.

Accordingly, to secure such sheet metal member to the rim, projections are formed in the metal of the rim to which the sheet metal elements are welded. In order to secure the ends of the spokes to the upstanding portions of the sheet metal elements, projections are formed in the sheet metal elements adapted to contact with the metal of the ends of the spokes to form the weld joints.

In order to insure that the spoke unit and the rim are properly arranged, and in order that the load may be transmitted from the rim to the spoke unit with a minimum of stress upon the weld, it is desirable that the ends of the spokes should be in contact with the metal of the rim.

In order to accomplish this, I may either form the spoke portion of such outside diameter that it may be sprung in compression and fitted into the rim where, due to the fact that the spoke unit is under compression, the ends of the spokes will be pressed against the metal of the rim; alternatively, the spoke portion may be made of such diameter as to be fitted into the rim without strain upon it, and while in place, a force may be applied to the hub portion of the spoke unit thereby causing the spoke unit to expand into contact with the metal of the rim, the spoke unit being so held until the operation of welding the spoke unit to the rim is completed.

In order that the spoke unit of my wheel may have sufficient strength for the use to which it is put and at the same time in order that the spoke unit may have the necessary resiliency in order that it may be sprung as pointed out hereinbefore, I form the spoke unit of my invention with spokes of channel form preferably U-shaped in cross-section. In order to securely unite the ends of the spokes to the rim, I weld the spokes on all three faces of the channel to the upstanding portion of the rim.

In joining the ends of the spokes to the upstanding portions of the rim, I prefer first to weld the bottom portion of the U of the spokes to corresponding parts of the upstanding member on the rim. This welding operation slightly expands the sides of the spokes and after the bottom of the U has been welded, the sides of the U are then welded to the corresponding portions of the upstanding member on the rim.

In this sequence of welding, the welding operation is performed in substantially a vertical direction relative to the plane of the welded surfaces.

In order to complete the wheel, it is necessary to secure the wheel attaching flange to the spoke unit. Accordingly, I so form the spoke unit as to provide, in the central portion thereof, surfaces to which the circular wheel attaching flange may be welded. In order that the plane of the weld may be parallel to the plane of the wheel, I form such surfaces by creating lips on those portions of the spoke unit in between the spokes. Correspondingly, the wheel attaching flange has, along its periphery, a marginal band of metal adapted to overlie in contact with the lips formed in the spoke unit for welding purposes.

The wheel attaching flange being made of metal heavier than that of the spoke portion of the wheel, the wheel attaching flange tends to dissipate the heat more rapidly during the welding operation than does the spoke portion; accordingly, projections are formed in the marginal band of the wheel attaching flange adapted to contact with the lips formed on the spoke portion. Thus the capacity of the wheel attaching flange for dissipating the heat from the welded portion is decreased so that the metals of the weld can attain the same temperature, and at the same time provision is made for affording contact between the parts to be welded at a plurality of points.

It is an object of my invention, therefore, to provide an improved method of welding the rim, spoke, and wheel attaching flange portions of a wheel together in an improved manner.

Another object of my invention is to provide an improved method of welding the parts of a wheel set forth in the recitation of the foregoing object, whereby the welded inner face between the welded wheel parts are disposed in plane which is perpendicular to the axis of the wheel.

Another object of my invention is to provide an improved method of welding the said parts of the wheel together in such a direction as to permit for maximum accessibility of the elements of said parts to be welded.

Another object of my invention is to provide a projection in the metal of a wheel rim to provide a surface perpendicular to the axis of the rim to which the end of the spoke may be welded.

Another object of my invention is to form a welding surface on the inner surface of the rim as will present a welding face perpendicular to the axis of the rim.

Another object of my invention is to so construct and arrange the various parts to be united by welding that, at the inner faces of the welds, the metal will attain approximately the same temperature during the welding operation.

Another object of my invention is to so arrange and connect the spoke unit to the rim that the load will be transmitted directly from the rim to the spoke unit independently of the welded joint.

Another object of my invention is to provide an improved method of welding the ends of wheel spokes to the rim of a wheel at three faces of a channel portion of the spokes.

Another object of my invention is to utilize the inherent resiliency of the sheet metal material of a sheet metal wheel to effect an efficient welding operation upon the sheet metal parts of the wheel to be welded together to form a complete weld.

Other objects and advantages of my present invention will appear in the following details of description taken in connection with the accompanying drawing, in which:

Fig. 1 is a sectional view of a rim;

Fig. 2 is a sectional view of a rim having upstanding flanges attached thereto;

Fig. 3 is a view partly in section and partly in elevation showing a spoke unit arranged in a supporting member;

Fig. 4 is a detail view in section showing the cross-sectional shape of the spokes and the relative arrangement of the supporting parts;

Fig. 5 is a view partly in elevation and partly in section showing the spoke portion and its support together with a rim arranged for welding to the spoke portion;

Fig. 6 is a view similar to Fig. 5 showing the welding operation;

Fig. 7 is a detail view showing the arrangement of an upstanding flange relative to the rim before welding;

Fig. 8 is a detail plan view of an upstanding flange for securing the spoke unit to the rim;

Fig. 9 is a broken away view in plan of a rim having upstanding flanges attached thereto;

Fig. 10 is a plan view, broken away, of the assembled rim and spoke portion prior to welding;

Fig. 11 is a detail cross-sectional view showing the union between a spoke, an upstanding flange and a rim;

Fig. 12 is a detail view in plan of the connection member of Fig. 11;

Fig. 13 is a detail view in section illustrating a modified method of attaching the spoke portion to the rim;

Fig. 14 is a view similar to Fig. 10 except that the union between the spoke portion and the rim is of the type illustrated in Fig. 13;

Fig. 15 is a view partly in section and partly in elevation showing the wheel attaching flange in assembled relation with the spoke portion and rim;

Fig. 16 is a view similar to Fig. 15 showing the welding operation;

Fig. 17 is a plan view broken away of an assembled spoke portion and rim illustrating the point of welding contact between the spoke portion and the wheel attaching flange.

I will now refer to the different figures of drawing in all of which like parts are designated by like reference characters and illustrate an embodiment of my invention.

According to my invention, I provide a conventional rim either of the drop center or the usual type such as indicated at 1 in Fig. 1 of the drawings. In order to provide a multiplicity of points for affording good electrical contact between the parts to be welded, I form projections 2 in the metal of the rim. As shown in Fig. 2, sheet metal members 3 having a cross-sectional shape corresponding to that of the spokes of the wheel are welded to the rim 1. The sheet metal members 3 are provided with marginal flanges 4 which may be formed by a pressing operation or in any other suitable manner, which marginal flanges rest against the projections 2 formed on the rim during the welding operation.

The sheet metal members 3 may be supported against the projections and the rim 1 in any suitable manner during the welding operation. In order to afford good electrical contact between the sheet metal members 3 and the spokes to be welded thereto, I provide the upstanding faces of the sheet metal members 3 with projections as indicated at 5.

In order to unite the spoke portion with the rim, the spoke portion is first arranged in a supporting member 6 as shown in Fig. 3 of the drawings. The supporting member 6 has upstanding lugs 7 between which the spokes 8 of the spoke portion 9 fit, so that the spoke portion will be held in a predetermined position within the support 6.

In order that the ends of the spokes of the spoke unit may rest against the metal of the rim directly, I form the spoke unit of a diameter slightly larger than the inside diameter of the rim, and the spokes and general configurations of the whole spoke portion as illustrated in the drawings is such as to give the spoke unit suitable resiliency, so that when the rim 1 is forced downwardly over the spoke unit, as indicated in Fig. 5, until the ends of the spokes come into welding position relative to the sheet metal members 3, the spoke unit is sprung so that the ends of the spokes are forced against the metal of the rim.

As shown in Fig. 5, the support 6 is provided with an upper face 10 upon which the lower edge of the rim 1 rests when the rim and spoke portion are in proper relative position. Thus the support 6 acts as an aligning tool to properly position the spoke portion 9 and the rim 1.

With the parts in position for welding as illustrated in Fig. 5, the welding tools 11 and 12, as shown in Fig. 6, are moved downwardly into welding position and then brought together along a line parallel to the axis of the wheel until the electrodes contact with the opposite sides of the parts to be welded.

When the electrodes 11 and 12 engage the metal, the welding operation takes place, the bottom portion of the spokes being welded first. Due to the fact that the rim 1 and the spoke portion 9 are held in proper relative position due to the forceable engagement of the ends of the spokes with the metal of the rim, it is possible to weld the spokes to the rim, one at a time, or several of the spokes may be welded at a time, as desired.

A welding operation performed on the bottom portions of the U-shaped spokes tends to deform the spokes so as to turn the side portions of the spokes inwardly towards the metal of the upstanding flange on the rim. Thus a good contact is obtained between the surfaces of the sides of the spokes and the corresponding surfaces of the upstanding flange on the rim. The welding operation is then completed by welding the side portions of the spokes to the corresponding portions of the flanges on the rim, or in case the upstanding portion is formed in the metal of the rim by welding the spoke portion to such part of the rim.

In order that the valve stem of the tire when placed upon the rim may be readily accessible, it is desirable to have the aperture formed in the rim to receive the valve stem positioned centrally between two of the spokes. Accordingly, as shown in Fig. 10, a tool 13 is provided to fit into the aperture 14 formed in the rim to receive the valve stem. The tool 13 is fixed relatively to the support 6, and since the support 6 is so formed as to hold the spokes of the rim in a predetermined position, the rim when arranged in place with the tool 13 accommodated in the aperture 14 is properly positioned so that the rim and spoke unit are brought together, the spokes adjacent the valve aperture span it equally and at the same time the rim and the spoke unit are so aligned as to bring the welding surfaces of each part into contact.

In Fig. 12 is illustrated an alternative form of upstanding element to be attached to the rim. The form of upstanding element 15 is provided with a flat surface 16 adapted to engage with the inner surface of the rim and be welded thereto, and is provided with upstanding portion 17 adapted to contact with and be welded to the ends of the spokes.

In the alternative method of uniting the spokes to the rim wherein the spoke has formed in the metal thereof an upstanding projection 18 as illustrated in Fig. 13, the upstanding projection 18 has formed thereon lugs or projections 19, extending in a direction parallel to the axis of the rim, and arranged to engage the surface of the spokes 8 to be welded thereto. As will be observed in Fig. 13, the relative arrangement of the projections 19 on the upstanding portion 18 of the rim 1 and the ends of the spokes 8 are such that the direction of the weld is parallel to the axis of the rim. By so arranging the parts, the utmost of accessibility for the welding operation is attained. It will also be observed that the end of the spoke 8 is arranged to rest against the shoulder 20 formed in the upstanding portion of the rim so that the strain or load may be transmitted from the rim directly to the spoke without unduly straining the welded joint.

After the operation of uniting the spoke unit to the rim has been completed, the next step is to unite the wheel attaching flange to the spoke unit. The wheel attaching flange 21 illustrated in Figs. 15 and 16, is a sheet metal member formed by pressing or spinning or any other suitable manner provided with apertures 22 to secure the wheel attaching flange and the parts attached thereto to the axle of a car. In order to unite the wheel attaching flange 21 to the spoke unit, the wheel attaching flange 21 is provided with a circumferential margin or band 23 such as adapted to overlie and rest upon portions 24 formed in those portions of the metal of the spoke unit lying between the spokes as illustrated in Fig. 17. The direction of the surfaces at the inner face of the weld, as will be seen from Figs. 15, 16, and 17, is such that the welding tools 25 and 26 may be moved substantially in directions parallel to the axis of the wheel in order to effect a welding operation thereby affording the maximum of accessibility for welding.

In order to afford good electrical contact at a multiplicity of points between the wheel attaching flange and the spoke unit, the wheel attaching flange has a plurality of projections 27 formed in the marginal band 23, which rests against the upper surface of the portions 24 of the spoke unit. Thus good electrical contact at the face of the weld is provided and, the heat dissipating capacity of the wheel attaching flange 21 is reduced until it is more nearly like that of the spoke unit so that the metal of the two parts attains approximately the same temperatures during the weld.

While the invention has been described as involving a plurality of successive welding operations, it will be apparent to one skilled in the art that all of the welding operations may be performed simultaneously or in any sequence desired. The operation of attaching the wheel attaching flange to the spoke unit may be performed before the spoke unit is attached to the rim. While the shape and relative arrangement of the parts of the wheel are such as are well adapted to the method of my invention, it is not essential to the effectiveness of that method that the exact constructions and arrangements illustrated and described in detail in this case be followed, it being possible to make many modifications therein as well be apparent to one skilled in the art without departing from the spirit and scope of the invention which is defined in the following claims.

I claim:

1. In the manufacture of wheels, the method comprising the formation of a wheel body having a spoke bearing nave with spokes extending radially outwardly thereof with the nave terminating axially outwardly of the spoke ends and the wheel body being outwardly radially resilient at portions inwardly axially of the nave termination, positioning the wheel body within a rim, applying oppositely directed forces to the said terminal nave portion of the wheel body and the spoke end portions thereby causing the wheel body to expand, the spokes moving radially outwardly into contact with the rim, and maintaining the wheel body in the expanded condition while welding the spoke ends to the rim.

2. In the manufacture of wheels, the method comprising the formation of a wheel body having a spoke bearing nave with spokes extending radially outwardly thereof, the nave being of deeply dished generally conical form terminating axially outwardly of the spoke ends and the wheel body being outwardly radially resilient at portions inwardly axially of the nave termination, the axially outer spoke walls flaring axially outwardly and radially inwardly and merging with the nave, positioning the wheel body within a rim, applying oppositely axially directed forces to the said nave terminal portion and the spoke end portions thereby causing the wheel body to expand, the spokes moving radially outwardly into contact with the rim, maintaining the wheel body in the expanded condition and welding the spoke ends to the rim.

3. In the manufacture of wheels, the method comprising the formation of a wheel body having a spoke bearing nave with channel shaped spokes extending radially outwardly thereof with the nave terminating axially outwardly of the spoke ends and the wheel body being outwardly radially resilient at portions inwardly axially of the nave termination, positioning the wheel body within a rim having radially inwardly extending projections thereon adapted to be engaged by the spoke ends, exerting oppositely directed pressure on the rim and the said terminal nave portion, maintaining the wheel body with the spoke ends exerting radially outwardly directed pressure against the rim and with axially directed pressure against the radially inwardly extending projections on the rim and welding the spoke ends to portions engaged thereby.

4. In the manufacture of wheels, the method comprising the formation of a wheel body having a spoke bearing nave with spokes extending radially outwardly thereof with the nave terminating axially outwardly of the spoke ends and the wheel body being outwardly radially resilient at portions inwardly axially of the nave termination, positioning the wheel body within a rim having radially inwardly extending projections thereon adapted to be engaged by the spoke ends, applying axially oppositely directed forces to radially spaced portions of the wheel body and the rim whereby the spoke ends are pressed against the radially inwardly extending projections on the rim whereby the spokes move radially outwardly and exert radially outwardly directed pressure against the rim and welding the spoke ends to portions engaged thereby.

5. In the manufacture of wheels, the method comprising the formation of a wheel body having a spoke bearing nave with spokes extending radially outwardly therefrom and with portions of the wheel body extending axially outwardly of the spoke ends, and the wheel body being outwardly radially resilient at portions inwardly axially of the said extended portion, positioning the wheel body within a rim, applying oppositely directed pressure to the spoke end portions and to the said outwardly extending wheel body portion, thereby causing the wheel body to expand, the spokes moving radially outwardly into contact with the rim, and maintaining the wheel body in the expanded condition while welding the spoke ends to the rim.

OSCAR U. ZERK.